United States Patent
Bogdahn et al.

(10) Patent No.: US 11,140,874 B2
(45) Date of Patent: Oct. 12, 2021

(54) RETRACTABLE LEASH FOR ROLLING UP AND UNROLLING A LEASH

(71) Applicant: flexi—Bogdahn Technik GmbH & Co. KG, Bargteheide (DE)

(72) Inventors: Manfred Bogdahn, Hamburg (DE); Jürgen Groth, Groß Schenkenberg (DE)

(73) Assignee: FLEXI—BOGDAHN TECHNIK GMBH & CO. KG, Bargteheide (DE)

( * ) Notice: Subject to any disclaimer, the term of this patent is extended or adjusted under 35 U.S.C. 154(b) by 453 days.

(21) Appl. No.: 15/964,741

(22) Filed: Apr. 27, 2018

(65) Prior Publication Data
US 2018/0317456 A1    Nov. 8, 2018

(30) Foreign Application Priority Data

May 2, 2017    (DE) .................... 10 2017 109 355.9

(51) Int. Cl.
| | |
|---|---|
| *A01K 27/00* | (2006.01) |
| *B65H 75/44* | (2006.01) |
| *B65H 75/48* | (2006.01) |

(52) U.S. Cl.
CPC ....... *A01K 27/004* (2013.01); *B65H 75/4418* (2013.01); *B65H 75/48* (2013.01)

(58) Field of Classification Search
CPC .. A01K 27/004; B65H 75/4418; B65H 75/48; B65H 75/4423
USPC .................................................. 119/795–97
See application file for complete search history.

(56) References Cited

U.S. PATENT DOCUMENTS

| | | | |
|---|---|---|---|
| 4,266,619 A | 5/1981 | Bodine | |
| 5,518,197 A * | 5/1996 | Gray | B60R 22/415 242/382.2 |
| 6,523,500 B1 * | 2/2003 | Zenteno | A01K 1/04 119/786 |

(Continued)

FOREIGN PATENT DOCUMENTS

| | | |
|---|---|---|
| CN | 1530268 A | 9/2004 |
| CN | 201414335 Y | 3/2010 |

(Continued)

OTHER PUBLICATIONS

English-language translation of DE 202012101380 U1 (Year: 2012).*
English-language translation of NL 1005781 (Year: 1998).*

*Primary Examiner* — Lisa L Tsang
(74) *Attorney, Agent, or Firm* — McGlew and Tuttle, P.C.

(57) ABSTRACT

A retractable leash device (10, 53) for rolling up and unrolling a leash (13), especially for leading an animal, includes a leash roller (22) mounted rotatably on a carrier and a resetting device to reset the leash into a rolled-up position, in which the leash is wound up onto a leash roller. A blocking feature blocks the unrolling of the leash. A transmission is coupled to the leash roller and brings about blocking when a predetermined leash length is unrolled from leash roller. A simple configuration with high operating reliability and low wear is provided with the transmission having a first transmission element arranged rotatably on the carrier and a second transmission element arranged nonrotatably on the carrier. The first transmission element and the second transmission element have an outer circumference and an inner circumference associated with one another, which mesh with one another at least in an active state.

9 Claims, 10 Drawing Sheets

(56) References Cited

U.S. PATENT DOCUMENTS

| | | | | |
|---|---|---|---|---|
| 2008/0011895 A1* | 1/2008 | Bleshoy | ............. | B65H 75/4431 |
| | | | | 242/382.4 |
| 2009/0217886 A1 | 9/2009 | Lopusnak | | |
| 2011/0073047 A1* | 3/2011 | Simpson | ............. | A01K 27/004 |
| | | | | 119/796 |
| 2011/0126778 A1 | 6/2011 | Mitchell | | |
| 2013/0008392 A1 | 1/2013 | Holmstrom | | |
| 2013/0200197 A1* | 8/2013 | Bogdahn | ............ | A01K 27/004 |
| | | | | 242/396 |
| 2016/0081306 A1* | 3/2016 | Fikfak | ................ | B65H 75/4428 |
| | | | | 119/796 |
| 2016/0338323 A1* | 11/2016 | Nishida | ................ | A01K 27/004 |
| 2017/0142935 A1* | 5/2017 | Max | ...................... | A01K 27/004 |
| 2017/0295755 A1* | 10/2017 | Hill | ...................... | A01K 27/004 |
| 2018/0027775 A1* | 2/2018 | Smith | ................ | B65H 75/4431 |
| 2018/0288973 A1* | 10/2018 | Chen | .................... | A01K 27/004 |

FOREIGN PATENT DOCUMENTS

| | | | | |
|---|---|---|---|---|
| CN | 202282977 U | | 6/2012 | |
| CN | 105494142 A | | 4/2016 | |
| CN | 108471724 A | | 8/2018 | |
| DE | 100 35 583 A1 | | 4/2001 | |
| DE | 202012101380 U1 * | | 6/2012 | ............. B65H 75/48 |
| DE | 10 2016 207 739 A1 | | 11/2016 | |
| EP | 1462323 A1 | | 9/2004 | |
| EP | 1878341 B1 | | 7/2010 | |
| GB | 2 481 403 A | | 12/2011 | |
| NL | 1005781 C2 * | | 10/1998 | ............. B65H 75/44 |
| SU | 1639553 A1 | | 4/1991 | |
| SU | 1678263 A1 | | 9/1991 | |
| WO | 2017/091701 A1 | | 6/2017 | |

\* cited by examiner

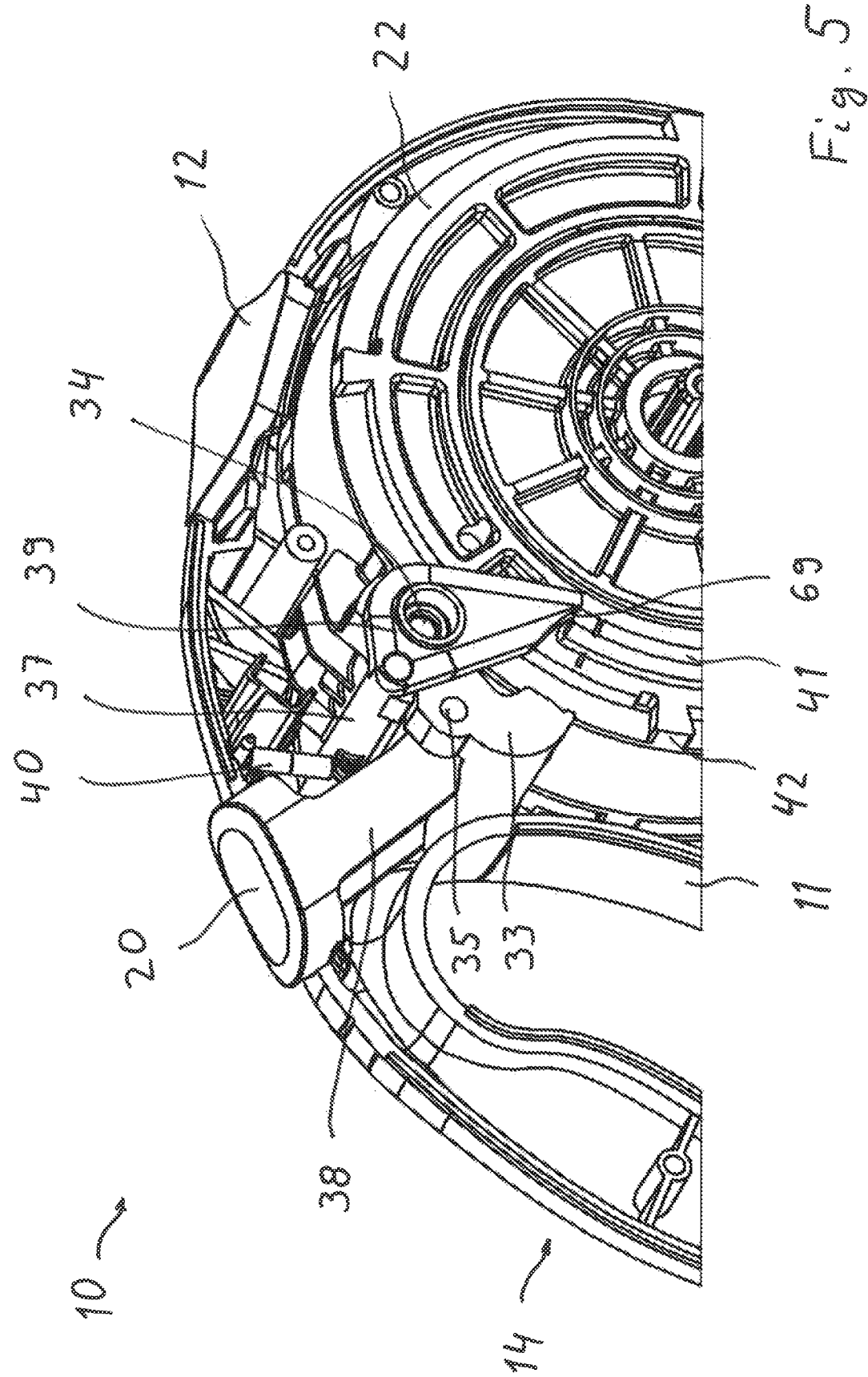

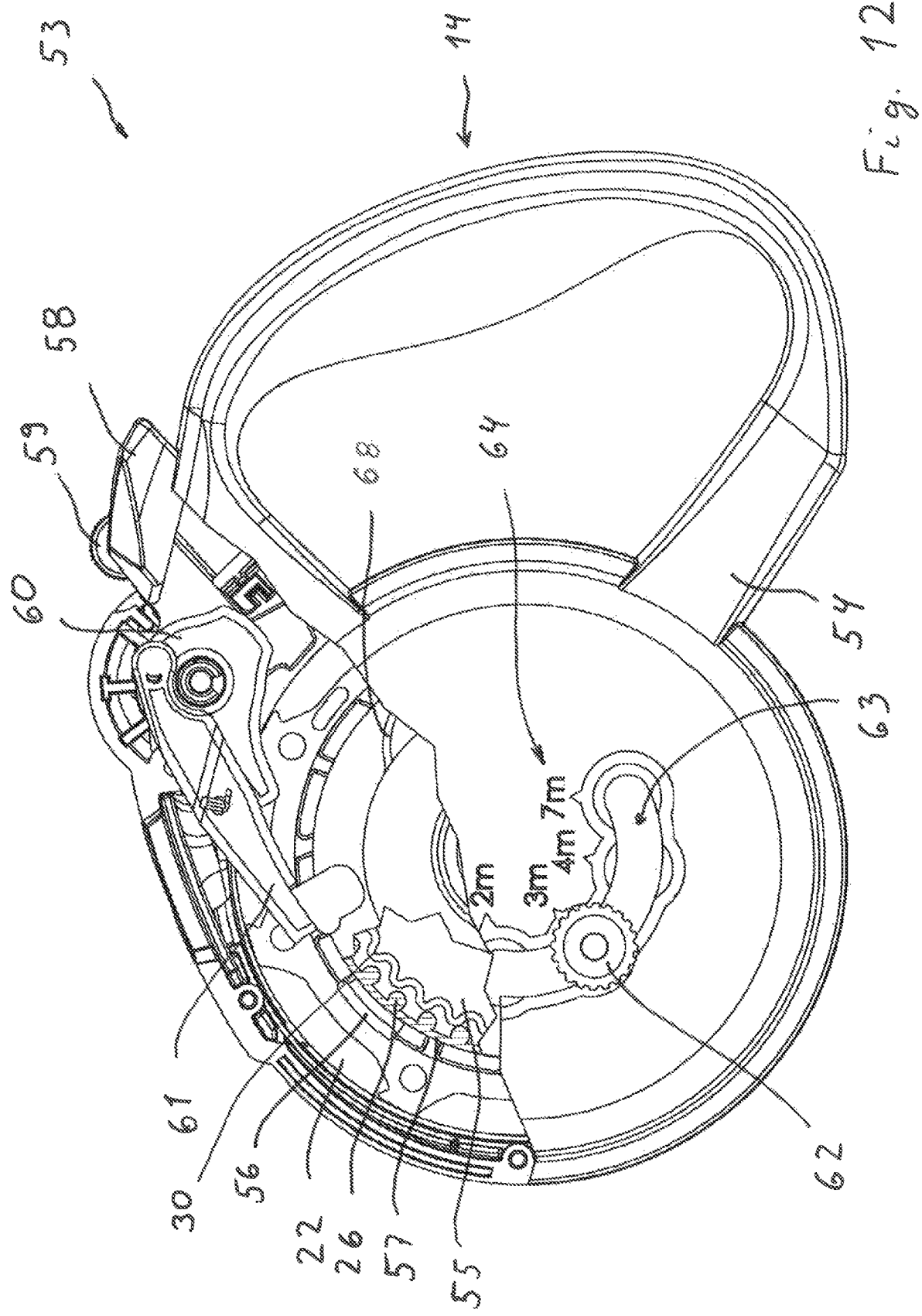

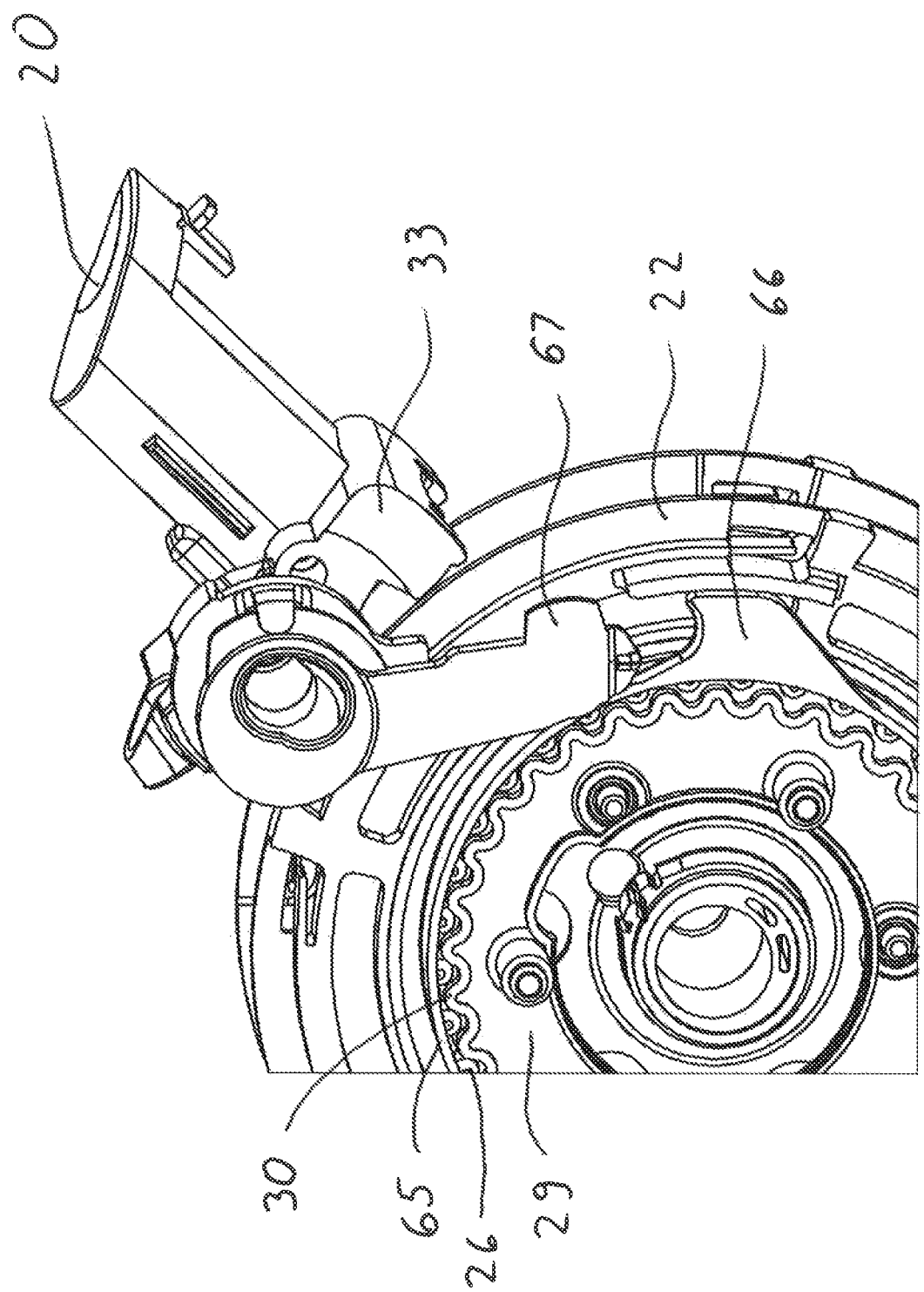

RETRACTABLE LEASH FOR ROLLING UP AND UNROLLING A LEASH

CROSS REFERENCE TO RELATED APPLICATIONS

This application claims the benefit of priority under 35 U.S.C. § 119 of German Application 10 2017 109 355.9, filed May 2, 2017, the entire contents of which are incorporated herein by reference.

FIELD OF THE INVENTION

The present invention pertains to a retractable leash (retractable leash device) for rolling up and unrolling a leash, especially for leading an animal, with a leash roller, which is mounted rotatably on a carrier and can be reset by means of resetting means into a rolled-up position, in which the leash is wound up onto the leash roller; with blocking means for blocking the unrolling of the leash from the leash roller; and with a transmission, which is coupled to the leash roller and brings about blocking of the blocking means when a predetermined leash length is unrolled from the leash roller.

BACKGROUND OF THE INVENTION

Such a retractable leash is known from US 2013/0008392. In case of the prior-art retractable leash, the leash roller is coupled by means of a bevel gear transmission to a spindle, on which a nut runs to effect the blocking of the blocking means. By adjusting a carrier in relation to the position of the nut, blocking of the blocking means can be brought about in case of a selectable leash length. The drawback of the prior-art retractable leash is that the bevel gear transmission with the spindle has comparatively many delicate moving parts. The length limiter is exposed to high wear. In addition, damage, for example, in the case of a passing dog, in case of the naturally high forces occurring may occur in a retractable leash.

DE 10 2016 207 739 A1 shows a similar retractable leash. In this retractable leash, a multistep spur gear pair is provided as transmission. A length limiter can also be achieved as a result. However, this retractable leash has only the possibility of switching off or switching on the length limiter. Selection of the leash length is not possible. Also in case of this retractable leash, the transmission consists of a plurality of small movable parts with fine and delicate gears. High wear and insufficient operating reliability are also expected in this case.

SUMMARY OF THE INVENTION

A basic object of the present invention is to make possible a retractable leash with a length limiter with high operating reliability, low wear and with a simple configuration.

The object is accomplished in a retractable leash of the above-mentioned type by the transmission having a first transmission element, which is arranged rotatably on the carrier, and a second transmission element, which is arranged nonrotatably on the carrier, and that the first transmission element and second transmission element have an outer circumference (outer circumferential surface) and an inner circumference (inner circumferential surface) associated with one another, which mesh with one another at least in an active state.

A transmission connection with reliable operation and low wear for releasing the blocking means can be guaranteed with few parts and low effort in this manner.

One variant of the present invention is characterized in that the outer circumference is smaller than the inner circumference. The outer circumference can be arranged in the inner circumference in this manner and unroll on same. The outer circumference preferably has external teeth and/or the inner circumference has internal teeth. These teeth can mesh with one another. A good frictional connection is made possible in this manner. The teeth may have a curved section-shaped configuration. Especially low shear forces occur in this manner. When, in one variant, the number of teeth of the external teeth is unequal, especially smaller, than the number of teeth of the internal teeth, a gear ratio can be set in a simple manner and as desired. In particular, it is advantageous when the external teeth have one tooth fewer than the internal teeth. The external teeth especially preferably have 32 teeth and the internal teeth have 33 teeth. In this manner, a speed reduction ratio of 32 to 1 is achieved. With external teeth with 31 teeth and internal teeth with 32 teeth, a speed reduction ratio of 31 to 1 can be achieved in the same manner.

Another variant of the present invention is characterized in that the first transmission element is mounted eccentrically on the leash roller. In particular, the first transmission element is mounted rotatably on the leash roller. A simple coupling of the leash roller to the transmission for driving same can be brought about due to this eccentricity. Thus, force can be transmitted in a simple and largely wear-free manner when the transmission is an eccentric transmission. The transmission is preferably a cycloidal transmission. Such a cycloidal transmission transmits a torque in a rolling manner and hence is not exposed to shear forces. Sudden failures due to rupture are thus practically ruled out.

An advantageous embodiment of the present invention is characterized in that the first transmission element has a release means. In this manner, the blocking means can be released in a simple manner. One variant is characterized in that the release means has a release element arranged on the outer circumference. When the release element is, for example, a projection, an especially simple configuration is obtained for bringing about the blocking of the blocking means. It is, moreover, advantageous when a transfer means is provided for transferring a release torque onto the blocking means. These transfer means make possible a simple transfer of the release torque at the desired location. An especially simple configuration is obtained when the transfer means has a push rod. Further, it is advantageous when the transfer means can be reset. A repeated release of the blocking means is made possible in this way. The transfer means can preferably be reset into an inoperative position. This makes possible defined starting conditions before releasing the blocking means. A resetting of the transfer means by means of a spring results in an especially simple and reliable configuration.

One variant of the present invention is characterized in that the blocking means has a blocking element. This blocking element can reliably block the leash roller. It is especially advantageous for this when the blocking means can be meshed with the leash roller. The blocking means can preferably be pivoted into a blocked position. This results in a simple and stable configuration. The pivoting of the blocking element can be reinforced by the unrolling motion of the leash roller and especially the tensile force acting on the leash. A type of servo mechanism is obtained in this way. The reinforcement of the pivoting and thus of the meshing action of the blocking means due to the tensile force on the leash is also advantageous independently of the present invention. Moreover, it is advantageous when the blocking means can be reset. As a result, a repeated release is in turn possible. The blocking means can preferably be reset into an inoperative position. This results in a defined starting position. An especially simple configuration for the resetting is obtained due to the provision of a spring.

One advantageous embodiment is characterized in that the blocking element can be brought into active connection with the release means. In this way, the blocking element can be driven by the leash roller rotating comparatively quickly. It is thereby advantageous when the blocking element has an abutting section. This abutting section can be configured such that a reliable and error-free meshing is supported. A simple and effective embodiment is obtained when the abutting section can be caused to mesh with a carrier on the leash roller. The interaction of the carrier with the abutting section can then bring about a pivoting of the blocking element into the blocked position. In this way, the tensile force of a leashed animal, for example, of a dog, is used to support the blocking of the leash roller. A type of servo support is formed for the brake mechanism.

Another variant of the present invention is characterized in that an actuating means is provided for manually actuating the blocking means. In this way, the blocking means can be used twice, namely once for the length limiter and once for a manual blocking. The configuration is especially simple when the actuating means has a pushbutton. Such pushbuttons are reliable and can transmit great force with high operating reliability.

Another variant of the present invention is characterized in that a selection means is provided for selecting the predetermined leash length. The predetermined leash length can be adapted to the particular need in this manner. This makes the retractable leash especially comfortable.

Another variant is characterized in that the selection means has an adjusting means for adjusting the angular position of the second transmission element to the carrier. A simple configuration of the selection means is possible in this manner. The adjustment can take place continually or gradually. A continual adjustment makes the use comfortable. A gradual adjustment results in a simple configuration and a high operating reliability. A display of the angular position is preferably provided on a housing of the retractable leash. The angular position can be seen from the outside in this manner. It is for this purpose possible to guide an operating element through the housing to adjust the angular position. In this manner, the operating element may also equally be used as a display.

Another variant of the present invention is characterized in that a release means is provided for releasing the first transmission element and the second transmission element from one another. The length limiter can be switched on or switched off by means of these release means. This makes the construction robust and low-wear, since no mechanical stress takes place in the released state. The second transmission element is preferably released from the first transmission element. This further simplifies the configuration, since the second transmission element is nonrotatable.

A variant is characterized in that the release means has an adjustable release element. This release element makes possible a reliable release. The release element may be manually adjustable. This results in a simple configuration and especially an intuitive operation. The release element is preferably a rotatable release disk. Tilting during the release motion is thus almost impossible. When the release disk has at least one slope, a reliable simple release can take place by means of this slope. It is, moreover, advantageous when at least one cam associated with the second transmission element slides on the slope for the release. This results in a defined release motion. The cam may advantageously be configured as a slope. In this way, comparatively low stresses of the material occur.

An exemplary embodiment of the present invention is explained below in more detail on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a perspective partial view of the retractable leash from FIG. 1 in a blocked position with removed right-hand housing half;

FIG. 12 is a partially cut-away view of another retractable leash as a second exemplary embodiment of the present invention; and FIG. 13 is the essential components of a length limiter of another exemplary embodiment of the present invention in a partial view.

DESCRIPTION OF THE PREFERRED EMBODIMENTS

Figure 1:
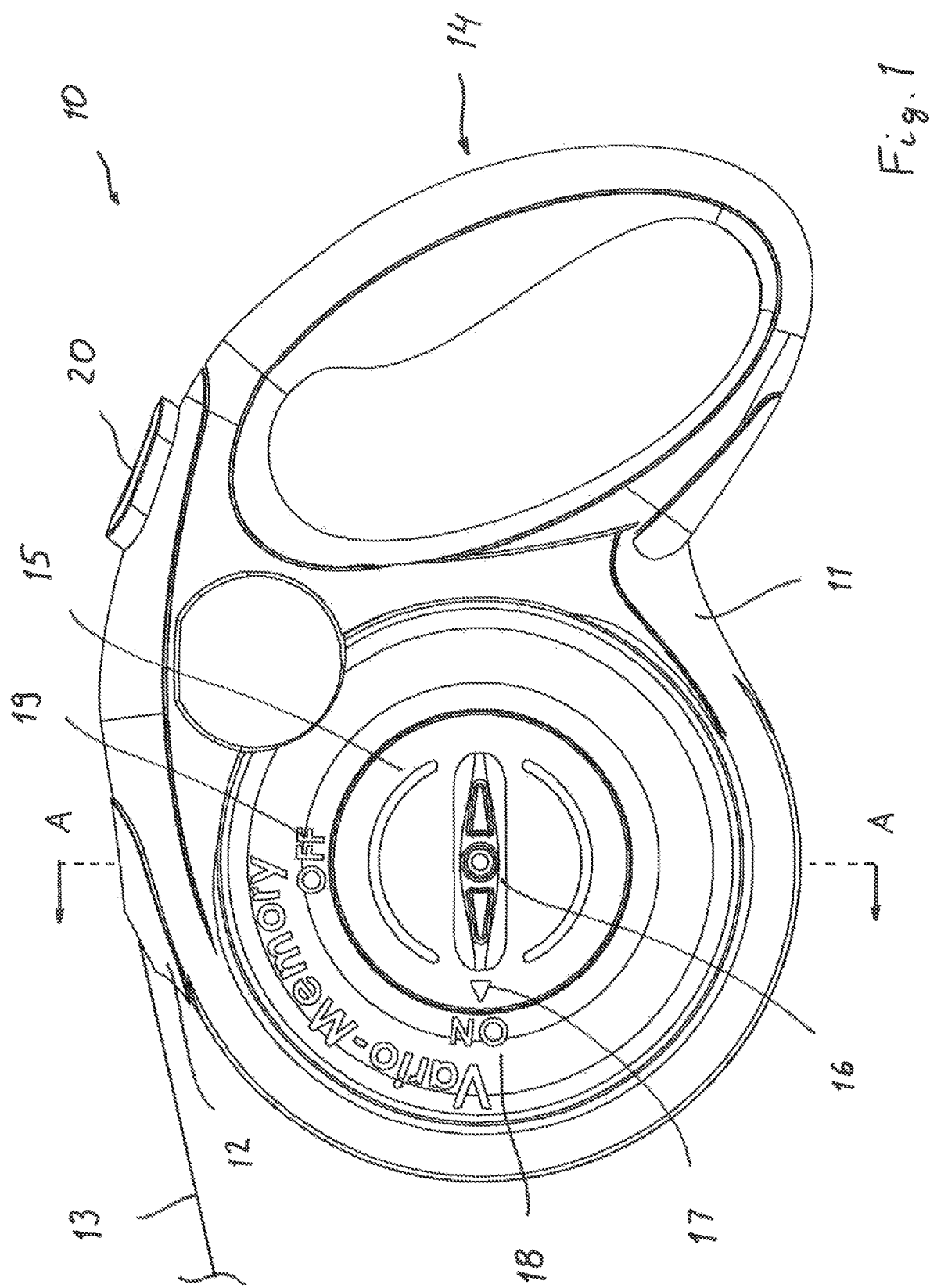
FIG. 1 is a lateral view of a retractable leash as a first exemplary embodiment of the present invention.

Referring to the drawings, FIG. 1 shows a lateral view of a retractable leash 10 as a first exemplary embodiment of the present invention. The retractable leash 10 has a housing 11, from which a leash 13 can be pulled out in the known manner by means of an outlet piece 12. The leash 13 may be a cable or a belt. The leash 13 is wound up by means of spring force onto a leash roller arranged in the interior of the housing 11 and can be pulled out of the housing 11 by a pet, especially a dog or a cat, against the spring force. A handle 14 is arranged at the end of the housing 11 facing away from the outlet piece 12. The handle 14 can be held manually by an operator for leading the pet tethered to the leash 13.

As can be further inferred from the figure, the housing 11 has an adjusting disk 15 that is arranged on the side. The adjusting disk 15 has an actuating element 16, which has an elongated shape and runs approximately in the longitudinal direction of the housing 11 in FIG. 1. In extension of the actuating element, a display element 17 is arranged in the figure on the side of the adjusting disk 15 facing away from the handle 14. In the exemplary embodiment shown, the display element 17 is configured as a triangle 17, the apex of which points radially from the adjusting disk 15 outwards.

Display elements 18, 19 on the housing are arranged adjacent to the adjusting disk 15 and associated with the display element 17. In the position shown, the display element 17, i.e., the triangle 17 with its apex, points to the display element 18, which consists of the letters ON in the exemplary embodiment shown. A length limiter of the outlet length of the leash 13 from the housing 11, which length limiter will be explained in more detail below, is switched on in this position. By rotating the adjusting disk 15 clockwise by 90° by means of actuating the actuating element 16 in the figure, the display element 17 is brought into a position, in which the apex of the triangle 17 points to the display element 19. In the exemplary embodiment shown, the display element 19 is formed by the letters OFF and indicates a state, in which the length limiter of the retractable leash 10 is switched off.

As can, moreover, be inferred from FIG. 1, a pushbutton 20 is arranged on top on the housing 11 in the area of the handle 14 shown in FIG. 1. The pushbutton 20 is used to actuate a blocking means for manually blocking an outlet of the leash 13 from the housing 11, as will be explained in more detail below.

Figure 2:
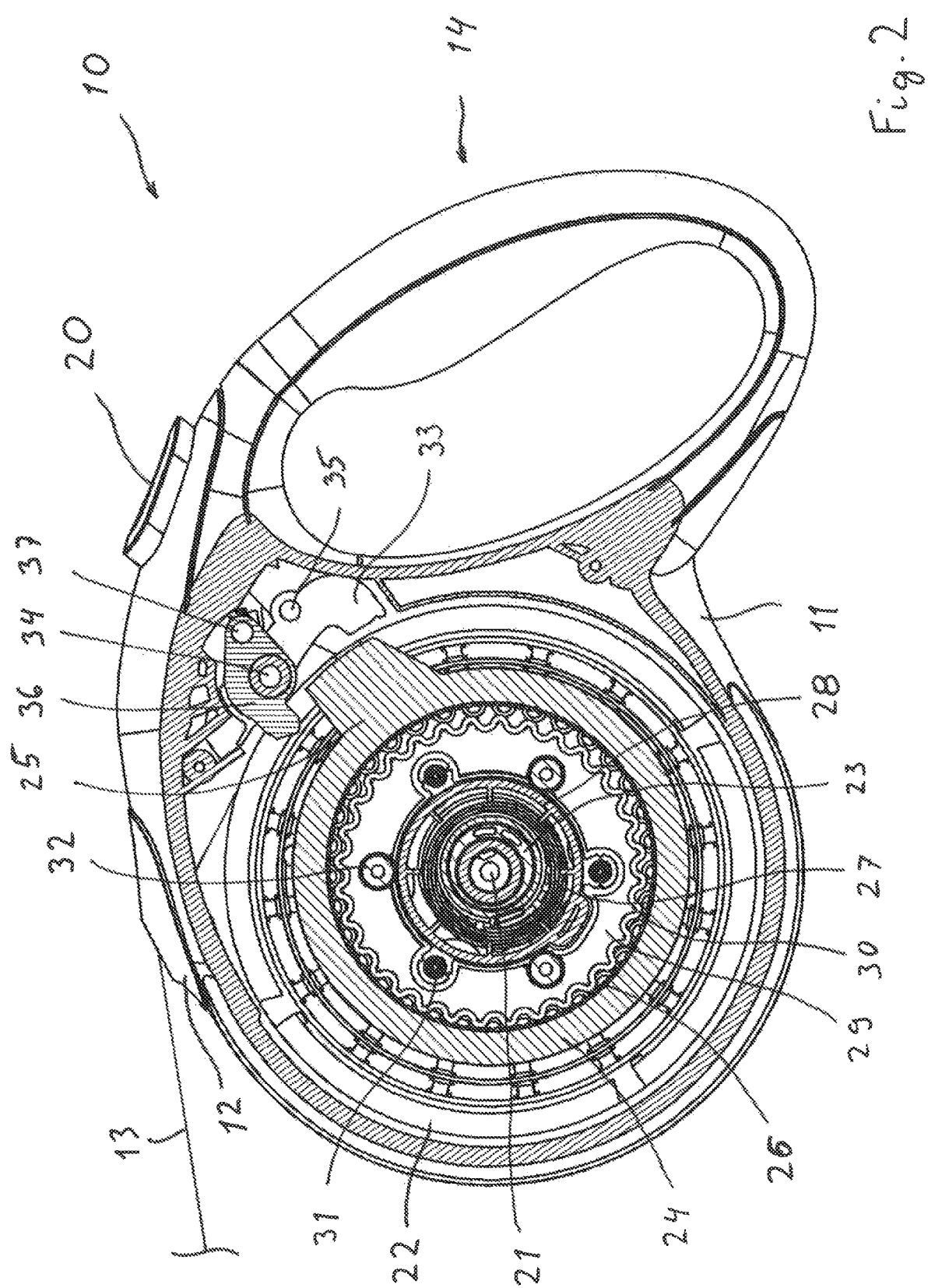
FIG. 2 is a partially cut-away lateral view of the retractable leash from FIG. 1.

FIG. 2 shows a partially cut-away lateral view of the retractable leash 10 from FIG. 1. As can be inferred from the figure, the retractable leash 10 has a leash roller 22 mounted in the housing 11 rotatable about an axis 21 in the known manner. The leash roller 22 is used to roll up and unroll the leash 13. A cam 23 is connected, rotatable about the axis 21, nonrotatably to the leash roller 22. A first transmission element 24, which has a projection 25 protruding outwards on its outer circumference, is arranged rotatably on the cam 23.

In the exemplary embodiment shown, the first transmission element 24 has a circular ring-shaped configuration and has internal teeth 26 on an inner circumference (inner circumferential surface). The teeth of the internal teeth have a circle segment shape in the exemplary embodiment shown. The first transmission element 24 is coupled to a base 28, which is arranged nonrotatably in the housing 11, by means of a coil spring or roller spring 27. The first transmission element 24 can be rotated counterclockwise and clockwise in this manner out of a first transmission element inoperative position shown in the FIG. 2 and again returned into the first transmission element inoperative position shown without deflecting force due to the coil spring or roller spring 27.

As can be inferred from FIG. 2, a second transmission element 29 is arranged in the interior of the first transmission element 24. The second transmission element 29 has a circular disk-shaped configuration and has an outer circumference (outer circumferential surface) corresponding to the inner circumference of the first transmission element 24 in the exemplary embodiment shown. The outer circumference of the second transmission element 29 is especially slightly smaller than the inner circumference of the first transmission element 24. External teeth 30 are arranged on the outer circumference of the second transmission element 29. The teeth of the external teeth 30 are likewise configured as having a circle segment shape and corresponding to the teeth of the internal teeth 26 of the first transmission element 24 in the exemplary embodiment shown.

The second transmission element 29 has, moreover, three guide pins 31, of which only one guide pin 31 is provided with a reference number in the figure for the sake of clarity. The guide pins 31 are used for accommodating coil springs, not shown in the figures, by means of which the second transmission element 29 is supported nonrotatably on the housing 11. Three connection elements 32, of which again only one connection element 32 is provided with a reference number for the sake of clarity, are provided in the second transmission element 29 arranged adjacent to the guide pins 31 and each between two guide pins 31. The connection elements 32 will be dealt with in more detail below.

A pivot lever 33 is arranged pivotably about a pivot axis 34 adjacent to the pushbutton 20. In this connection, the pivot lever 33 is connected to the pushbutton 20 pivotably about another axis 35, as will be explained in more detail below. Further, a tilting element 36 is arranged pivotably about the pivot axis 34. The tilting element 36 has a rod-shaped connection piece 37, which can only be seen in cross section in the figure.

Figure 3:
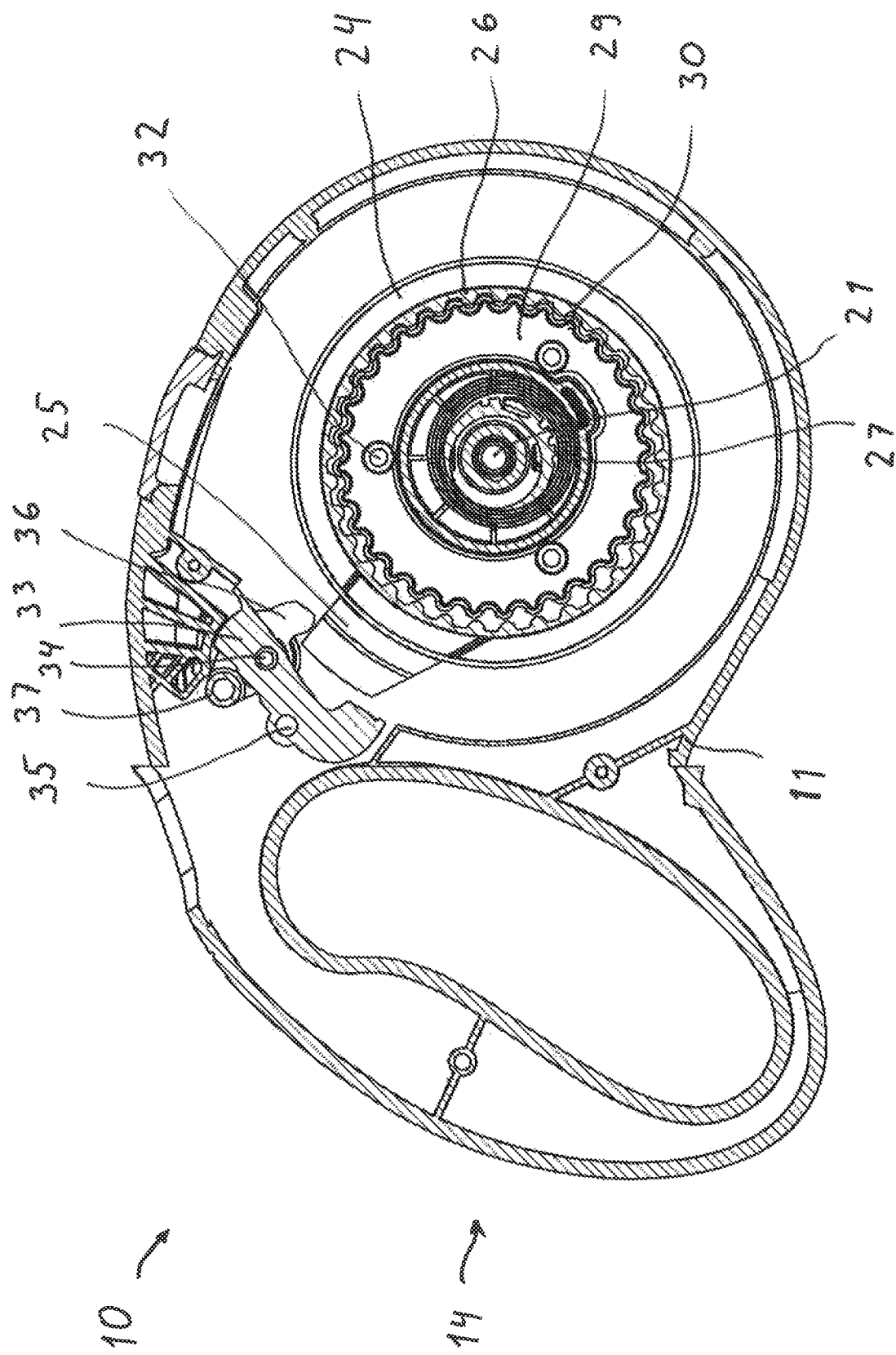
FIG. 3 is a lateral view of a left-hand housing half of the retractable leash from FIG. 1 as viewed from the right.

FIG. 3 shows a lateral view of the left-hand half of the housing 11 as viewed from the interior of the housing. The leash roller 22 is omitted in the figure.

As can be inferred from FIGS. 2 and 3, the first transmission element 24 and second transmission element 29 together form a cycloidal transmission. In this case, the first transmission element 24 is configured as a rotor 24 and the second transmission element 29 is configured as a stator 29. In the exemplary embodiment shown, the stator 29 has 32 teeth and the rotor 24 has 33 teeth. In this way, upon each rotation of the leash roller 22, the projection 25 in FIG. 2 moves counterclockwise by a likewise counterclockwise 32nd rotation. If the projection 25 stops at the tilting element 36, then a blocking element for blocking the unrolling motion of the leash roller 22 is released, as is explained below on the basis of FIG. 4.

Figure 4:
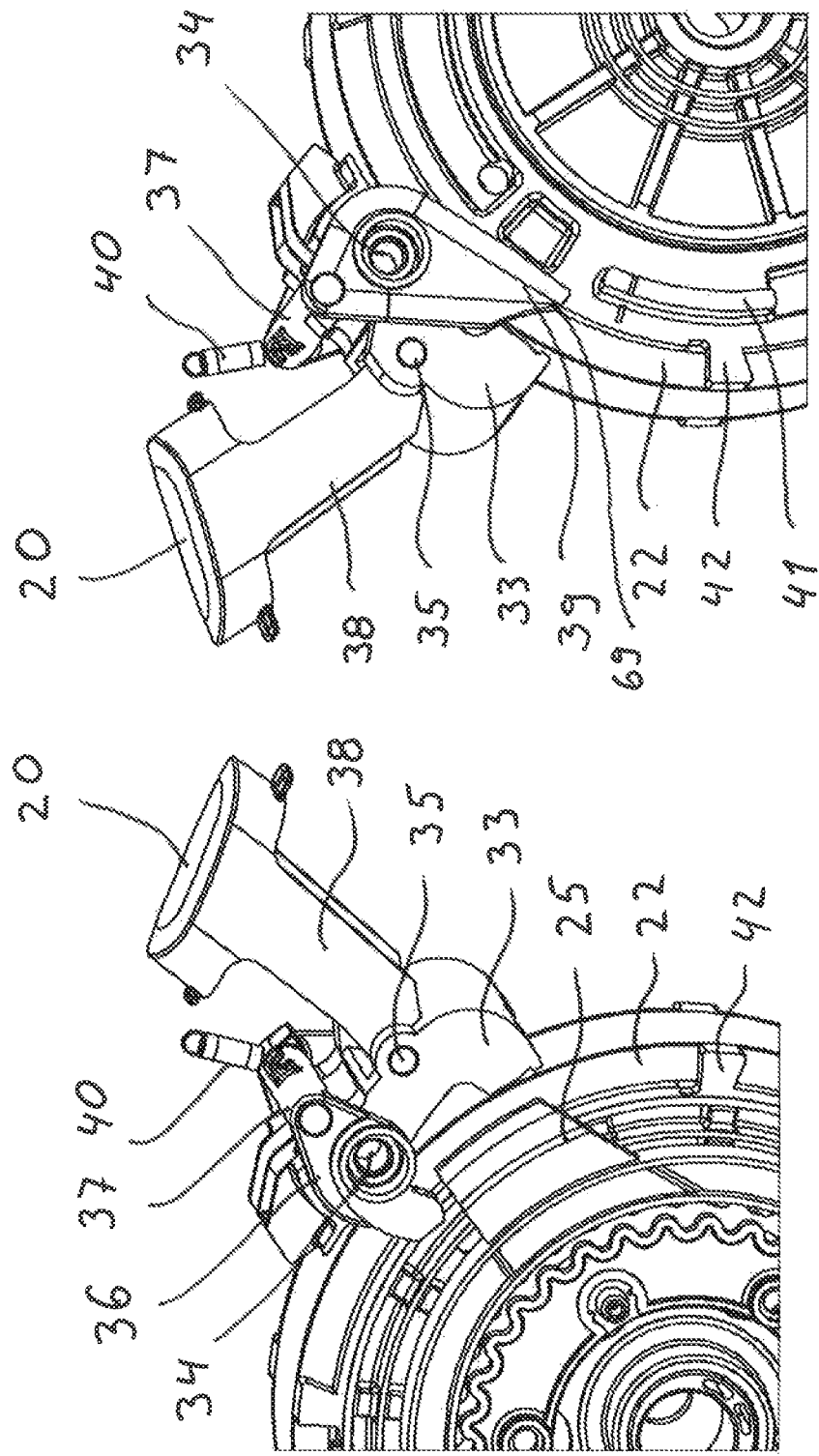
FIG. 4 is a partial view of individual components for the length limiter of the retractable leash from FIG. 1.

FIG. 4 shows a schematic partial view of the leash roller 22 with the essential components of the length limiter as viewed from both sides. As can be inferred from the FIG. 4, the pushbutton 20 is connected via a neck 38 to the axis 35 of the pivot lever 33. As can further be inferred from FIG. 4, the connection piece 37 is connected at a connection piece end facing away from the tilting element 36, which is mounted pivotably about the pivot axis 34. Further, a spring 40, which holds the blocking element 39 in the position shown, is provided at the connection piece 37.

As can, moreover, be inferred from FIG. 4, a carrier 41 for the blocking element 39 is provided on the outside of the leash roller 22 in the circumferential direction. Moreover, the leash roller 22 has a stop 42 for the pivot lever 33, which stop is arranged approximately radially on the outer circumferential edge. The side of the blocking element 39 facing the carrier 41 is configured as a tip and has a concave abutting section 69.

The leash roller 22 can be rolled up and unrolled in the state shown in FIG. 4. If the pushbutton 20 is actuated by pressing downwards in FIG. 4 parallel to the direction of extension of the neck 38, the pivot lever 33 is pivoted about the pivot axis 34 towards the leash roller 22. As a result, the blocking element with the abutting section 69 meshes with the carrier 41 and is pivoted from this counterclockwise in the right-hand part of FIG. 4. The concave configuration of the abutting section 69 ensures a good, reliable frictional connection with the carrier 41. Provided the pivot lever 33 has not been completely pressed down onto the leash roller 22 by pressing the pushbutton 20, a movement of the pivot lever 33 close to the leash roller 22 takes place due to the stopping of the connection piece 37 at the pivot element 33, where the stop 42 strikes against the end of the pivot lever 33 and blocks a further unrolling of the leash roller 22 in this manner.

If the length limiter is switched on, the projection 25 butts against the lower end of the tilting element 36, which end is facing the leash roller 22, and thus brings about a pivoting of the connection piece 37 onto the pivot lever 33. In this manner, the blocking element 39 is pivoted counterclockwise in the right-hand part of the figure and thus the abutting section 69 is detected by the carrier 41 when the leash roller 22 is further unrolled. This leads in turn to a pressing down of the pivot lever 33 by means of the connection piece 37 and ultimately to a stopping of the stop 42 at the end of the pivot lever 33 facing the leash roller 22. The leash roller 22 is blocked against a further unrolling of the leash 13 in this manner. The carrier 41 at the leash roller 22, which is rotating quickly by contrast to the rotor 24, thus ensures a fast and reliable meshing of the pivot lever 33 and the stop 42 when interacting with the abutting section 69 of the blocking element 39.

FIG. 5 shows a perspective partial view of the retractable leash 10 with removed right-hand side of the housing in a position, in which the leash roller 22 is blocked. As can be inferred from FIG. 5, the blocking element 39 with its abutting section 69 meshes with the carrier 41 and upon further clockwise rotation of the leash roller 22 in the FIG. 5, pivots the pivot lever 33 about the pivot axis 34 clockwise in FIG. 5, as a result of which the end of the pivot lever 33 facing the leash roller 22 meshes with the stop 42 and reliably blocks a further unrolling of the leash roller 22.

Figure 6:
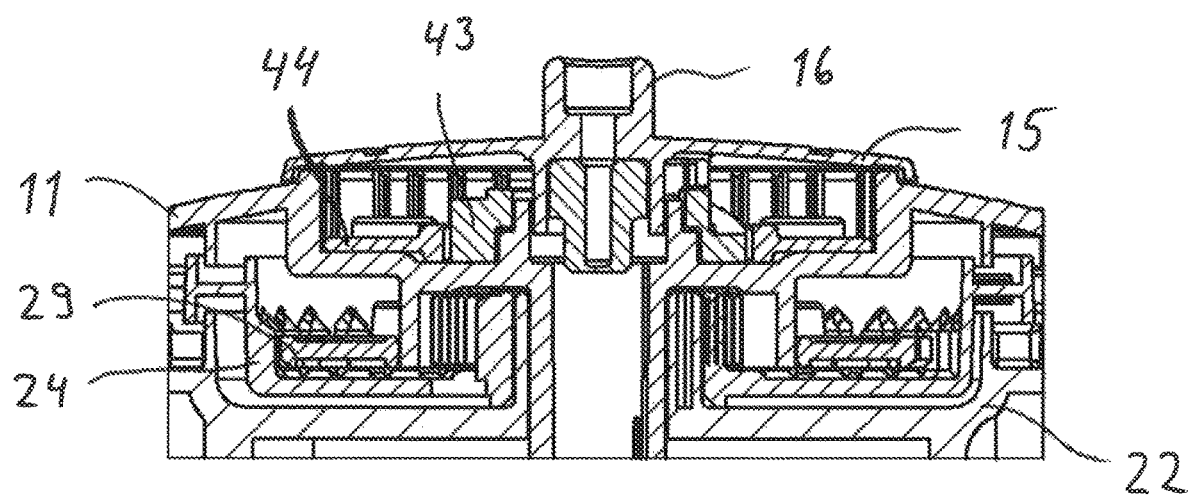
FIG. 6 is a partial view of section A-A from FIG. 1 in a meshed position of the transmission.

FIG. 6 shows section A-A of FIG. 1 in a partial view. As can be inferred from FIG. 6, a release disk 43 is arranged between the housing 11 and the adjusting disk 15. The release disk 43 is connected nonrotatably to the adjusting disk 15, so that a rotation of the rotatable adjusting disk 15 by means of the actuating element 16 brings about a rotation of the release disk 43. Further, the release disk 43 is arranged enclosing a connection disk 44, which is permanently connected to the stator 29. In the state shown, the connection disk 44 is brought into a lowered state by the release disk 43, in which the stator 29 meshes with the rotor 24. This represents the meshed state of the rotor 24 and the stator 29, in which the length limiter is switched on. In this state, the unrolling of the leash roller 22 brings about a counterclockwise moving of the rotor 24 in FIG. 2 and blocking of the leash roller in the manner described above.

Figure 7:
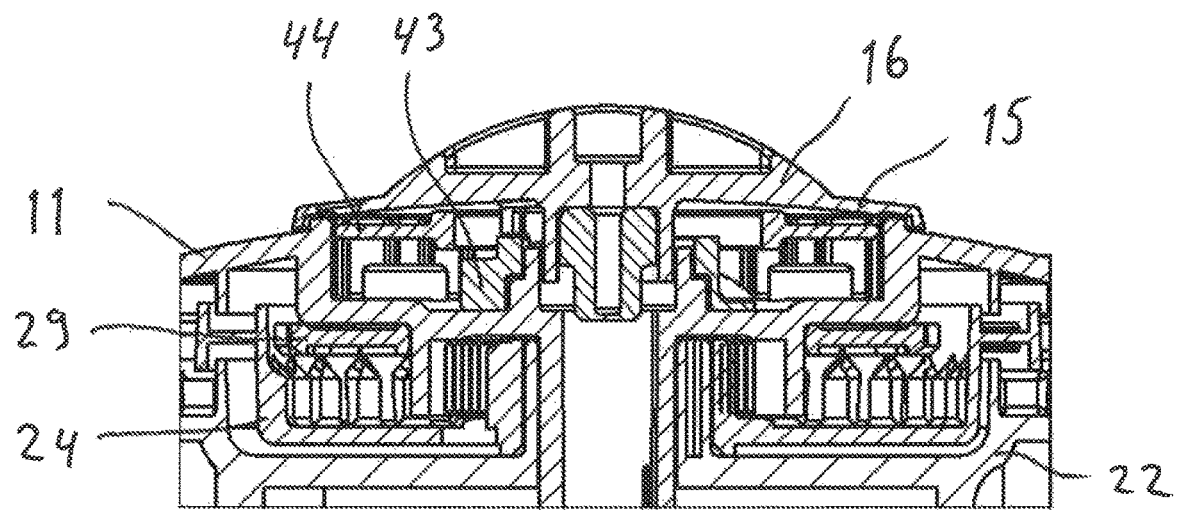
FIG. 7 is a view similar to FIG. 6 in a released position of the transmission.

FIG. 7 shows a view similar to FIG. 6 with the adjusting disk 15 rotated clockwise by 90° in FIG. 1. In this state, the connection disk 44 is brought by the release disk 43 into the raised position shown. As a result, the stator 29, connected to the connection disk 44, is likewise raised from the rotor 24 and thus released from same. In the state shown, the rotor 24 does not mesh with the stator 29. In the released state shown, the leash roller 22 can be freely rotated until full unrolling of the leash 13.

Figure 8:
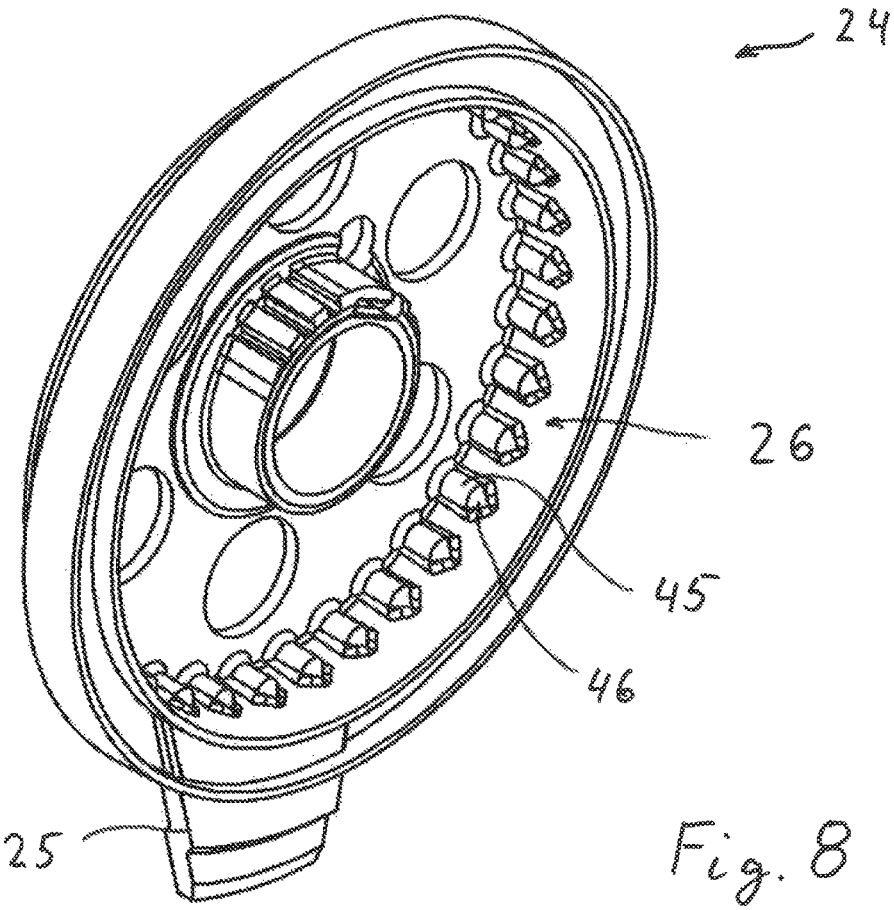
FIG. 8 is a perspective view of a first transmission element of the retractable leash from FIG. 1.

FIG. 8 shows a perspective view of the rotor 24. As can be inferred from FIG. 8, the internal teeth 26 have teeth 45 with a circle segment-shaped cross section. The teeth 45 have a tip 46.

Figure 9:
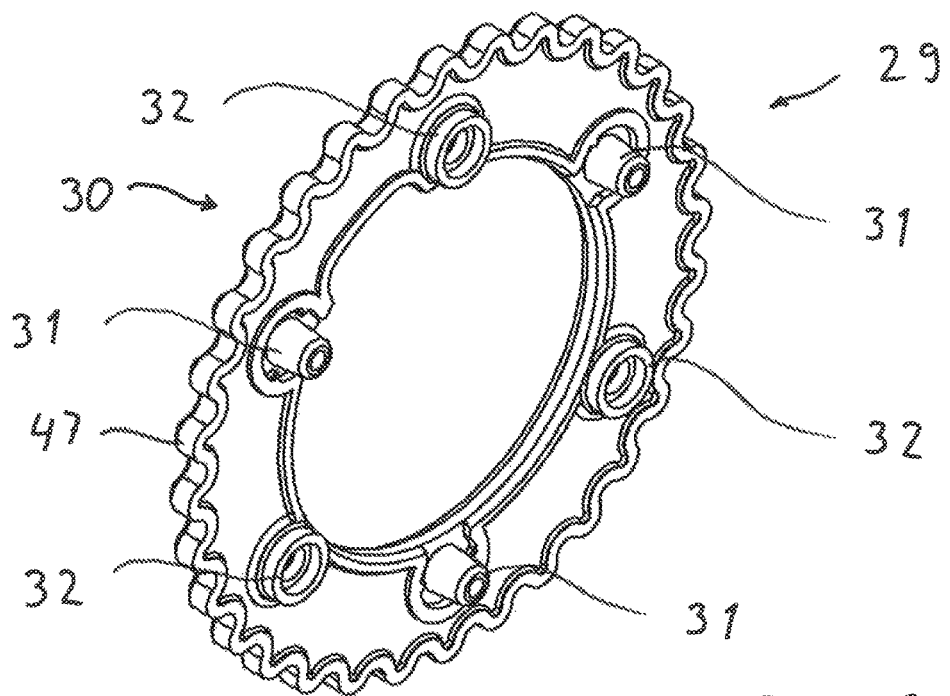
FIG. 9 is a perspective view of a second transmission element of the retractable leash from FIG. 1.

FIG. 9 shows a perspective view of the stator 29. As can be inferred from the figure, the external teeth 30 have circle segment-shaped teeth 47. Due to the tips 46 of the teeth 45 of the rotor 24, a meshing of the stator in the rotor for the meshing of the internal teeth 26 with the external teeth 30 is also possible if the teeth 47 are at least partially flush with the teeth 45. In this case, a sliding of the teeth 47 onto the tips 46 occurs, as a result of which a clean meshing is guaranteed for the meshing of the teeth 45, 46 with one another.

Figure 10:
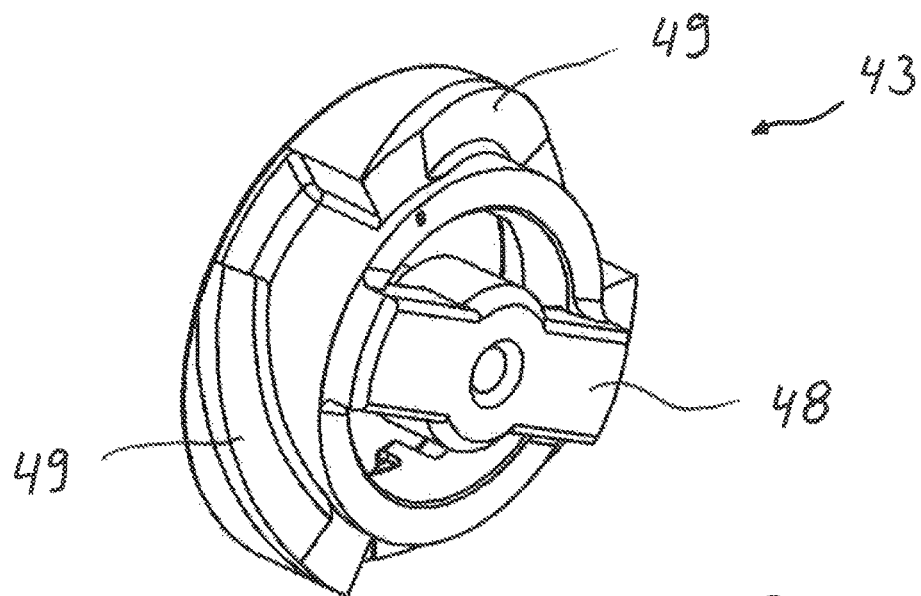
FIG. 10 is a perspective view of a release disk of the retractable leash from FIG. 1.

FIG. 10 shows a perspective view of the release disk 43. As can be inferred from FIG. 10, the release disk 43 has a fastening section 48 in a central area. The fastening section 48 extends lengthwise along a part of the diameter of the release disk 43. The fastening section 48 interacts with an associated fastening section on a rear side of the adjusting disk 15 for the nonrotatable coupling of the adjusting disk and the release disk 43 to one another. As can be further inferred from FIG. 10, the release disk 43 has ramps 49 in its outer edge area. A total of three ramps 49, of which only two ramps 49 can be seen in FIG. 10, are provided in the release disk 43.

Figure 11:
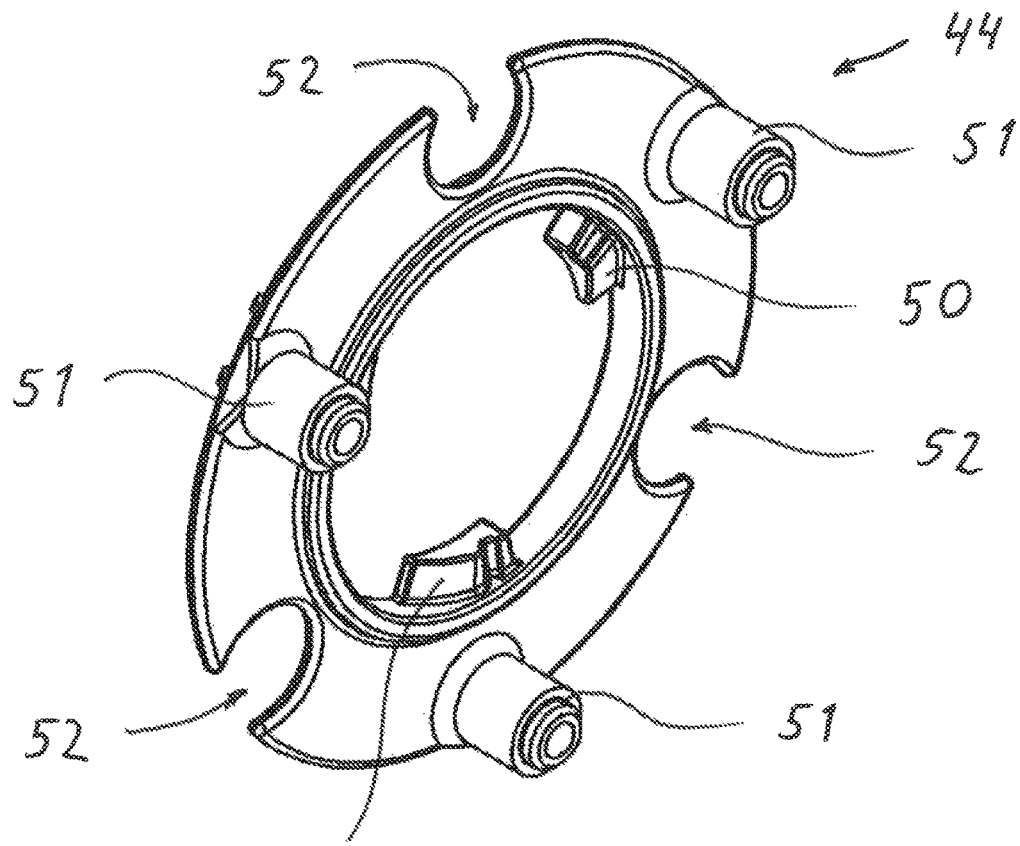
FIG. 11 is a perspective view of a connection disk for the second transmission element of FIG. 9 in a position turned down by 180° to the second transmission element.

FIG. 11 shows a perspective view of the connection disk 44 in a position turned down by 180° against the stator 29 of FIG. 9. As can be inferred from FIG. 11, the connection disk 44 has in an inner area ramps 50, which are associated with the ramps 49 of the release disk 43. A total of three ramps 50, of which only two ramps 50 can be seen in FIG. 11, are provided. In the outer area, the connection disk 44 has three connection elements 51 associated with the connection elements 32 of the stator 29 and three recesses 52 associated with the guide pins 31 of the stator 29. In an assembled state, the connection elements 51 are connected to the connection elements 32 and the guide pins 31 with coil springs arranged on them extend through the recesses 52. In this assembled state, the ramps 50 slide on the ramps 49. As a result, due to a rotation of the adjusting disk 15 and thus a rotation of the release disk 43, a release of the stator 29 from the rotor 24 can be brought about by the counterclockwise sliding of the ramps 50 on the ramps 49 in FIG. 10. In this case, coil springs guided on the guide pins 31 can be pressed together against an abutment at the housing 11. When the adjusting disk 15 and thus the release disk 43 in FIG. 10 are rotated counterclockwise, the stator 29 is pressed onto the rotors 24 by coil springs guided on the guide pins 31 and brought into the stator meshed position due to sliding of the ramps 50 on the ramps 49, as shown in FIG. 6.

FIG. 12 shows a partially cut-away view of a retractable leash 53 as a second exemplary embodiment having the features of the present invention. The retractable leash 53 corresponds to the retractable leash 10. Identical elements have the same reference numbers. By contrast to the retractable lash 10, the retractable leash 53 does not have the adjusting disk 15. The retractable leash 53 has a housing 54 similar to the housing 11. In the interior of the housing 11 is arranged a rotor 55 similar to the rotor 24 and a stator 57 similar to the stator 29, wherein the rotor 55 has the external teeth 30 and the stator 57 has the internal teeth 26. Instead of the pushbutton 20, the retractable leash 53 has a pushbutton 58 and a locking element 59. The manner of functioning of the pushbutton 58 is identical to the manner of functioning of the pushbutton 20, wherein the pushbutton 58 can be locked in a pressed-down state by means of the locking element 59.

A tilting element 60 with essentially identical functionality is provided instead of the tilting element 36. The tilting element 60 is connected to a lever 61. Instead of a projection 25, a projection 56, which is configured as a strap 56 in the exemplary embodiment shown, is arranged in the outer area of the rotor 55. If, when the leash roller 22 is unrolled, the leash 56 becomes meshed with the end of the lever 61, which end is on the roller side in FIG. 12, this lever 61 is pushed to the right in FIG. 12. This brings about a clockwise pivoting of the tilting element 60. As a result, blocking of the roller outlet is brought about in the manner already described above regarding the retractable leash 10. In addition, a ramp 68 is arranged in an outer area of the stator 57.

Unlike in the case of the retractable leash 10, the rotor 55 and the stator 57 are continually meshing in the retractable leash 53 shown. The stator 57 can be rotated about a stator axis of rotation by means of an actuating element 62. As a result, the angular position of the strap 56 and of the ramp 68 can be adjusted. In the housing 54 a curved path 63 is provided, along which the actuating element 62 can be adjusted. Moreover, a display 64 is provided along the curved path 63. In the exemplary embodiment shown, the display 64 consists of the data of the leash run length in case of the corresponding positions of the actuating element 62. In this way, the desired run length of the leash from the leash roller 22 can be gradually or continually adjusted.

If the stator 57 is rotated counterclockwise up to the stop by means of the actuating element 62 in the figure, then the ramp 68 raises the lever 61. The lever 61 is thereby rotated clockwise, without also pivoting the tilting element 60. The strap 56 may in this case no longer mesh with the lever 61. The leash 13 can be fully unrolled.

If the stator 57 is rotated by means of the actuating element 62 in FIG. 12, then, moreover, the distance of the strap 56 to the lever 61 is shortened or lengthened. Blocking of the roller outlet then takes place after a smaller run length in case of a shorter distance of the strap 56 from the lever 61 or after a greater run length in case of a greater distance.

FIG. 13 shows the perspective view of the essential components of another embodiment of a retractable leash having the features of the present invention. Identical components have the same reference numbers. Unlike the retractable leash 10, the exemplary embodiment shown has a rotor 65 with a projection 66. The projection 66 meshes with a push rod 67, which further sends the release torque to the pivot lever 33 in the manner described above.

While specific embodiments of the invention have been shown and described in detail to illustrate the application of the principles of the invention, it will be understood that the invention may be embodied otherwise without departing from such principles.

What is claimed is:

1. A retractable leash device for rolling up and unrolling a leash, the leash device comprising:
    a carrier;
    a leash roller mounted rotatably on the carrier;
    a resetting means for resetting the leash on the leash roller into a rolled-up position, in which the leash is wound up onto the leash roller;
    a blocking means for blocking the unrolling of the leash from the leash roller;
    a transmission coupled to the leash roller to bring about blocking of the blocking means when a predetermined leash length is unrolled from the leash roller, the transmission comprising a first transmission element arranged rotatably relative to the carrier, and a second transmission element arranged nonrotatably relative to the carrier, wherein the first transmission element has an inner circumferential surface and the second transmission element has an outer circumferential surface associated with the inner circumferential surface, the outer circumferential surface and the inner circumferential surface meshing with one another at least in an active state; and
    a release means for releasing the first transmission element and the second transmission element from one another, the release means comprising a manual, adjustable release element comprising a rotatable release disk, the rotatable release disk comprising at least one slope, on which slides at least one cam comprised of a slope associated with the second transmission element, for the release thereof.

2. The retractable leash device in accordance with claim 1, wherein:
    the outer circumferential surface is smaller than the inner circumferential surface;
    the outer circumferential surface has external teeth and the inner circumferential surface has internal teeth which mesh with one another; and
    a number of teeth of the external teeth is smaller than a number of teeth of the internal teeth.

3. The retractable leash device in accordance with claim 1, wherein:
    the transmission is an eccentric cycloidal transmission; and
    the first transmission element is mounted eccentrically on the leash roller and rotatable relative to the leash roller.

4. The retractable leash device in accordance with claim 1, further comprising a transfer means comprising a push rod for transmitting a release torque to the blocking means, wherein:
    the first transmission element comprises the release means comprising the adjustable release element arranged at the outer circumferential surface;
    the release element comprises a projection for bringing about the blocking of the blocking means; and
    the transfer means can be reset into an inactive position by means of a spring.

5. The retractable leash device in accordance with claim 4, wherein:
    the blocking means comprises a blocking element that meshes with the leash roller for the blocking of the unrolling of the leash from the leash roller; and
    the blocking element can be pivotably reset into a blocked position reinforced by an unrolling motion of the leash roller and into an inactive position by means of a spring.

6. The retractable leash device in accordance with claim 5, wherein:
    the blocking element can be brought into active connection with the release means;
    the leash roller has a carrier element moveable therewith;
    the blocking element comprises an abutting section that is brought to mesh with the carrier of the leash roller; and
    the blocking element is pivoted into the blocked position.

7. The retractable leash device in accordance with claim 1, further comprising an actuating means for manually actuating the blocking means, wherein the actuating means comprises a pushbutton.

8. The retractable leash device in accordance with claim 1, wherein a selection means is provided for selecting the predetermined leash length.

9. The retractable leash device in accordance with claim 8, further comprising a housing connected to the carrier wherein:

the selection means comprises an adjusting means for adjusting an angular position of the second transmission element relative to the carrier continually or gradually; and
a display of the angular position, corresponding to a selected predetermined leash length, is provided on the housing.

* * * * *